United States Patent
Hulskotte

(10) Patent No.: US 6,642,288 B1
(45) Date of Patent: *Nov. 4, 2003

(54) HALOGEN-FREE FLAME-RETARDANT THERMOPLASTIC POLYESTER OR POLYAMIDE COMPOSITION

(75) Inventor: Richerdes J. M. Hulskotte, Tubbergen (NL)

(73) Assignee: DSM N.V., Heerlen (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/479,941

(22) Filed: Jan. 10, 2000

Related U.S. Application Data

(63) Continuation of application No. PCT/NL98/00226, filed on Apr. 22, 1998.

(30) Foreign Application Priority Data

Jul. 10, 1997 (NL) ............................................ 1006525

(51) Int. Cl.$^7$ ..................... C08K 5/3492; C08K 5/521; C08K 3/40; C08K 5/527

(52) U.S. Cl. .................... 524/100; 524/101; 524/117; 524/118; 524/119; 524/120; 524/145

(58) Field of Search ................................ 524/100, 101, 524/117, 127, 145, 119, 118, 120

(56) References Cited

U.S. PATENT DOCUMENTS

| | | | |
|---|---|---|---|
| 3,594,347 A | | 7/1971 | Lazarus et al. |
| 3,789,091 A | * | 1/1974 | Anderson et al. ........... 524/117 |
| 4,208,321 A | | 6/1980 | Sandler |
| 4,341,694 A | * | 7/1982 | Halpern ...................... 524/100 |
| 4,363,890 A | * | 12/1982 | Ohshita et al. ............. 524/101 |
| 4,789,698 A | * | 12/1988 | Bonten et al. .............. 524/100 |
| 4,866,114 A | * | 9/1989 | Taubitz et al. .............. 524/101 |
| 5,116,891 A | * | 5/1992 | Eberspach et al. .......... 524/100 |
| 5,147,912 A | * | 9/1992 | Moore ........................ 524/101 |
| 5,859,147 A | * | 1/1999 | Torre .......................... 524/119 |
| 5,990,270 A | * | 11/1999 | Torre et al. ................. 528/335 |
| 6,005,033 A | * | 12/1999 | Helmond et al. ........... 524/101 |
| 6,054,515 A | * | 4/2000 | Blount ........................ 524/118 |
| 6,114,036 A | * | 9/2000 | Rinehart et al. ............ 524/117 |
| 6,442,912 B1 | * | 9/2002 | Phillips et al. ............. 52/741.4 |

FOREIGN PATENT DOCUMENTS

| | | |
|---|---|---|
| EP | 0 672 717 A1 | 9/1995 |
| WO | WO 97/39053 | 10/1997 |
| WO | WO 97/42264 | 11/1997 |

OTHER PUBLICATIONS

Patent Abstract of Japan, JP 03 281652 A, vol. 016 (C–0919), No. 106, Mar. 16, 1992.

Patent Abstract of Japan, JP 05 070671 A, vol. 017 (C1087), No. 391, Jul. 22, 1993.

Patent Abstract of Japan, JP 06 157880 A, vol. 018 (C–1248), No. 485, Sep. 9, 1994.

Patent Abstract of Japan, JP 07 247410 A, vol. 096, No. 001, Jan. 31, 1996.

Patent Abstract of Japan, JP 08 073713 A, vol. 096, No. 007, Jul. 31, 1996.

Patent Abstract of Japan, JP 08 08169 A, vol. 096, No. 007 Jul. 31, 1996.

Patent Abstract of Japan, JP 08 269306 A, vol. 097, No. 002, Feb. 28, 1997.

Patent Abstract of Japan, JP 09 143350 A, vol. 097, No. 010, Oct. 31, 1997.

Patent Abstract of Japan, JP 09 143351 A, vol. 097, No. 010, Oct. 31, 1997.

Patent Abstract of Japan, JP 09 151305 A, vol. 097, No. 010, Oct. 31, 1997.

Patent Abstract of Japan, JP 09 157503 A, vol. 097, No. 010, Oct. 31, 1997.

Patent Abstract DD135207, Apr. 18, 1979.

Patent Abstract, DE 19614424, Oct. 16, 1997.

* cited by examiner

*Primary Examiner*—Peter Szekely
(74) *Attorney, Agent, or Firm*—Pillsbury Winthrop LLP

(57) ABSTRACT

The invention relates to a flame-retardant polyester or polyamide composition that contains a combination of a compound derived from triazine and an organic phosphorus compound. By choosing as the triazine compound a melamine condensation product, for example melam, a UL 94 V-0 and GWFI 960° classification can be obtained for glass-fibre reinforced polyester or polyamide with a relatively low concentration of flame-retardant additives, and without good mechanical properties being affected. Unusual is moreover that the CTI value can again be brought to 600 Volt for this glass-fibre reinforced polyester or polyamide. In a preferred embodiment use is made of a phosphorus-containing compound containing more than 14 wt. % P. The use thereof with for example melamine cyanurate results in optimum flame-retardant behaviour at a low total concentration of flame-retardant additives. Important additional aspects are improved crystallisation behaviour and a high stiffness.

9 Claims, No Drawings

HALOGEN-FREE FLAME-RETARDANT THERMOPLASTIC POLYESTER OR POLYAMIDE COMPOSITION

This application is a continuation of application Ser. No. PCT/NL98/00226 filed Apr. 22, 1998.

The invention relates to a halogen-free, flame-retardant thermoplastic polyester or polyamide composition that contains a combination of organic phosphorus compound and a nitrogen-containing flame retardant.

Such a composition is known from EP-A-672,717. This describes a flame-retardant polybutylene terephthalate, PBT, composition in which the organic phosphorus compound is a hydroquinone type of aromatic oligo- or polyphosphate and the nitrogen-containing flame retardant is a salt of a triazine derivative with at least one acid of cyanuric acid or isocyanuric acid. In the examples melamine, benzoguanamine and acetoguanamine are used as the triazine derivative. To obtain a UL-94 V-O classification, the compositions contain approx. 20 parts by weight of organic phosphorus compound and at least 8 parts by weight of triazine derivative per 100 parts by weight of PBT. With glass fibre present in the composition the required concentration of flame retardant combination was at least approx. 40 parts by weight per 100 parts by weight of PBT with 30 parts by weight of glass fibre.

Such high concentrations of flame retardant combination have a highly adverse influence on the polymer composition's mechanical and processing properties. For example, a value of at least 50° C. was found for the difference between Tm and Tc, Tm=melting point and Tc=crystallisation temperature, measured with differential scanning calorimetry (DSC), for the PBT-based compositions according to the aforementioned state of the art. For PBT without a flame retardant this difference is 35–40° C. resulting in a shorter cycle time in injection moulding. It is also known that organic phosphorus flame retardants, which are fluid at room temperature, have an adverse effect on the polymer composition's stiffness.

The invention's object is hence a halogen-free flame-retardant thermoplastic polyester or polyamide composition that does not present the aforementioned drawbacks, or possesses them to a substantially lesser extent.

The invention's object is achieved with a flame retardant combination that is characterised in that the compound derived from triazine is a melamine condensation product, preferably melam or melem. The invention also covers a halogen-free glassfibre reinforced thermoplastic polyamide composition in which the flame retardant combination is characterised in that the organic phosphorus compound contains at least 14 wt. % phosphorus and the compound derived from triazine is melamine cyanurate.

In principle, all the current thermoplastic polyesters and copolyesters and polyamides can be used as the thermoplastic polyester or polyamide for the composition. Examples of this are polyalkylene terephthalates or copolyesters thereof with isophthalic acid, for example polyethylene terephthalate, PET, polybutylene terephthalate, PBT, polyalkylene naphthalates, for example polyethylene naphthalate, PEN, polypropylene naphthalate, polybutylene naphthalate, PBN, polyalkylene dibenzoates, for example polyethylene dibenzoate and copolyesters hereof. Preferable are PET, PBT, PEN and PBN. Also suitable are block copolyesters which, in addition to hard polyester segments from the above group of thermoplastic polyesters, also contain soft polyester segments derived from at least one polyether or aliphatic polyester. Examples of such block copolyesters with elastomeric properties are for example described in "Encyclopedia of Polymer Science and Engineering", Vol. 12, p.75 ff. (1988), John Wiley & Sons and "Thermoplastic Elastomers", 2nd Ed., chapter 8 (1996) Hauser Verlag and the references mentioned therein.

Polyamides usefull in the practice of this invention include those which are well-known in the art, and for instance described in Encyclopedia op Polymer Science and Technology, Vol. 11, p.315, (1988) ISBN 0-471-80943-8 (V.11). The invention is especially very effective in polyamides having a melting point of higher than 265° C. For instance polyamide 4.6 and the copolyamides based on aliphatic and aromatic dicarboxylic acids. Examples thereof are polyamide 6/6.T, 6.6/6.T, 6.6/6/6.T, 6.6/6.I/6.T etc.

Melamine condensation products are for example melam, melem, melon and menthone and can for example be obtained with the process described in WO-A-96/16948. Preferably the dimer, melam, or the trimer, melem, is used.

In the combination with a melamine condensation product the phosphorus compound can be chosen from the wide group of organic phosphates, phosphites, phosphonates and phosphinates. Preferably use is made of phosphates and phosphonates. Examples of such compounds are described in for example Kirk Othmer, Encyclopedia of chemical technology, Vol. 10, p.396 ff. (1980).

A large number is commercially available, for example resorcinolbis(diphenylphosphate) oligomer, under the trade name Fyrolflex RDP from AKZO-Nobel, NL; cresyldiphenylphosphate, CDP, under the trade name Kronitex CDP from FMC, UK; trimethylolpropanol ester of methyl phosphoric acid, under the trade name Amgard P45 from Albright and Wilson, USA; polypentaerythritol phosphonate under the trade name Cyagard RF 1041 from American Cyanamid, USA. Hostaflam OP 910; a mixture of cyclic di- and triphosphonates containing 21 wt. % P, from Hoechst, Germany.

It is particularly advantageous to use an organic phosphorus compound with a phosphorus content of at least 14 wt. %; preferably 18 wt. %. An example of this are Amgard P45, and the metal phosphinates as for instance in U.S. Pat. No. 4,208,321 and U.S. Pat. No. 3,594,347.

A practical requirement for the organic phosphorus compound is a low volatility at the processing temperatures of the polyester or polyamide composition and the service temperature of objects obtained from the composition. For this reason cresyldiphenylphosphate, for example, is less suitable for guaranteeing flame-retardant behaviour in the longer term.

The compositions of the invention can be obtained in a simple way by means of mixing in the melt. Use is then preferably made of an extruder fitted with means that make it possible to dose the phosphorus compound, which is usually fluid at room temperature already. It is also advantageous if fibrous reinforcing materials can be dosed to the melt separately. It is also possible that the flame retardant components are already present in the polymerisation process for the production of the polyamide or polyester.

The concentration of organic phosphorus compound may vary within a wide range, for example between 0.5 and 20 wt. %, preferably between 1 and 12 wt. %, even more preferably between 2 and 10 wt. %. The concentration of the compound derived from triazine may vary within a wide range, for example between 2 and 25 wt. %, preferably between 3 and 20 wt. %, most preferably between 4 and 16 wt. %. Weight percentages are relative to the composition's total weight. A person skilled in the art will be able to determine the optimum composition in his case through systematic research.

The compositions according to the invention may furthermore contain the usual additives, for example heat stabiliser, UV stabilisers, pigments, processing agents, for example mould release agents, and fillers, for example clay and reinforcing fibres, for example glass fibres. More substances that improve the flame-retardant behaviour may optionally be added, for example char-forming substances such as polyphenylene ether and polycarbonate and substances that have an effect on the dripping behaviour, for example fluoropolymers such as polytetrafluoroethylene. Well-known stabilisers are for example hindered phenols.

In the presence of glass fibre reinforcement in particular the compositions according to the invention show surprising advantages. For example, the CTI, comparative tracking index, increases from approx. 350 Volt to 600 Volt, which presents particular advantages in electrical applications. In addition, moduli of elasticity are realized that have never before been published for polyester and polyamide compositions based on organic phosphorus-containing flame retardants with comparable flame-retardant behaviour.

The invention will now be further elucidated with reference to the following examples and comparative examples.

| Materials | |
|---|---|
| PBT, $\eta_{rel}$ = 2.0, | measured in m-cresol, from DSM, NL |
| PA-6 | nylon-6, having a relative viscosity, $\eta_0$ = 2.3 (in formic acid) |
| PA-6.6 | nylon-6.61, having a relative viscosity, $\eta_0$ = 2.4 (in formic acid) |
| PA-4.6 | Stanyl ® KS 200, $\eta_0$ = 2.3 (in formic) of DSM |
| PA-6.6/6.T/6.I | Amodel ® A 1133 HS, containing 33 wt % glassfibre, of AMOCO | resorcinol(bis-biphenylphosphate), Fyroflex RDP® from AKZO-Nobel. P content=10.5 wt. % cresyldiphenylphosphate, Kronitex CDP, from FMC, USA. P content=8.9 wt. %

Zn-salt of dimethyl phosphonic acid, (DMPA) was prepared from DMPA from Aldrich and Zn-acetate. P content=22 wt. %.

trimethylolpropanol ester of methylphosphoric acid, Amgard® P45, from Albright and Wilson, USA. P content=20.8 wt. % melam from DSM, the Netherlands. Particle size $d_{50}$=4 µm melamine cyanurate from DSM, $d_{50}$=8 µm glass fibre, length 4.5 cm, diameter 11 µm, PPG 3786 from PPG, France Compounding The compositions were mixed using a ZSK 30/39 D corotating twin-screw extruder with degassing at a set temperature of 250° C. voor PBT and PA-6, 280° C. for PA-6.6 and 300° C. for PA 4.6 en PA 6.6/6.T/6.I. 10 kg/hour throughput at a speed of 200 rpm. Ground PBT or polyamide and solid components were premixed in dry condition and dried for 24 hours at 90° C. Glass fibre was dosed separately via a side feed. The fluid phosphorus compounds were injected with the aid of a dosing pump. Amgard P45 was to that end diluted with acetone.

Injection-Moulding

Prior to the injection-moulding the granules obtained by compounding in the extruder were dried for 24 hours at 90° C.

An injection-moulding machine of type Engel 80 A was used for the injection-moulding at set temperatures of 235–245° C. for PBT and PA-6, 280–300° C. for PA 6.6 and 280–330° C. for PA 4.6 and PA 6.6/6.T/6.I. The mould temperature was 90° C. Dimensions:

UL-94 specimens: thickness 1.6 and 0.8 mm, resp.

tensile test specimens: thickness 4 mm glow wire test plates: 1 mm thickness

Tests

The following properties of the injection-moulded specimens were determined:

Flammability: UL-94, GWFI (glow wire flammability test) according to ISO-IEC 695-2-1.

Mechanical properties: tensile test according to ISO 527/1 using dry-as-moulded samples.

Differential scanning calorimetry, DSC, was carried out at a scanning speed of 20° C./minute from −110° C. to 250° C., after 10 minutes at 250° C., cooled at the same speed of 20° C./minute. The crystallisation temperature, $T_c$, was determined in the cooling curve, the melting point, $T_m$, was determined in the 2nd heating curve.

CTI, the comparative tracking index, was measured according to ISO IEC 112.

TABLE 1

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| PBT 5007 [wt. %] | 100 | 80 | 82.5 | 80 | 90 | 81 | 85 | 45 | 45 | 49 | 45 | 45 | 50 | 54 |
| Mecy [wt. %] | | | 10 | 12.5 | | 15 | 7.5 | 15 | 15 | 15 | | | | |
| Melam [wt. %] | | | | | | | | | | | 15 | 15 | 8 | 8 |
| Fyroflex RDP [wt. %] | | | | 7.5 | | | | 10 | | | 10 | | | |
| CDP [wt. %] | | | 7.5 | | | | | | | | | | | |
| Amgard P45 [wt. %] | | | | | 10 | 4 | 7.5 | | 10 | 6 | | 10 | 12 | |
| [Zn((CH$_2$)$_2$PO$_2$)$_2$]$_x$ | | | | | | | | | | | | | | 8 |
| PPG 3786 [wt. %] | | 20 | | | | | | 30 | 30 | 30 | 30 | 30 | 30 | 30 |
| UL-94 | | | | | | | | | | | | | | |
| (1.6 min 48 h. 23° C./50% RH) | N.C. | N.C | V-0 | V-0 | V-2 | V-0 | V-0 | N.C | V-2 | N.C. | N.C | V-0 | V-0 | V-0 |
| (1.6 mm 168 h. 70° C./50% RH) | . | . | V-0 | V-0 | V-2 | V-0 | V-0 | — | V-2 | N.C. | N.C | V-0 | V-0 | V-0 |

TABLE 1-continued

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 0.8 mm 48 h. 23° C./50% RH) |  |  | V-0 | V-2 | V-0 | V-0 | V-0 | — | — | — | — | — | — | — |
| (0.8 mm 168 h. 70° C./50% RH) | N.C. | N.C. | — | — | V-2 | V-0 | V-0 | — | — | — |  | — | — |  |
| GWFI (1 mm) [° C.] | — | — | 960 | 960 | 960 | 960 | 960 | 750 | 960 | 960 | 960 | 960 | 960 | 960 |
| elongation at break [%] | 100 | 3.5 | 23 | 17 | 9.4 | 3.2 | 5.4 | 3.1 | 2.0 | 2.2 | 2.8 | 2.5 | 2.5 | 2.8 |
| E-modulus [N/mm$^2$] | 2700 | 7000 | 1705 | 2036 | 2100 | 3100 | 2600 | 8200 | 8600 | 10300 | 8100 | 9600 | 10100 | 11000 |
| tensile strength [N/mm$^2$] | 55 | 120 | 37 | 40 | 53 | 53 | 51 | 85 | 92 | 105 | 80 | 105 | 110 | 118 |
| CTI [Volt] | 600 | 375 | — | 600 | — | — | — | — | — | 600 | — | 600 | — | 600 |
| $T_m$-$T_c$ [° C.] | 35–40 | — | — | 36 | — | — | — | — | 15 | 17 | — | 30 | — | - |

In Table 1 N.C. stands for 'no classification according to UL-94" (glow wire flammability test). If a measurement was not conducted, this is indicated by a dash:.

The results obtained for the non-reinforced compositions reflect the superior effect of Amgard P45 relative to the RDP, in terms of the flame-retardant properties, tensile strength and stiffness.

Composition 3 containing cresyldiphenylphosphate, P content 8.9%, also showed good flame-retardant behaviour relative to composition 4, but coupled to a very low stiffness. These flame-retardant properties could however not be retained in time because the cresyldiphenylphosphate is too volatile and gradually disappears with the composition. The advantages of Amgard P45 combined with melamine cyanurate are also clearly observable in glass-fibre reinforced compositions.

In the glow wire flammability test (GWFI) composition 8 was ignited at 750° C. already; in the case of composition 10 with a substantially lower concentration of phosphorus-containing flame retardant this temperature is 960° C. A UL-94 classification V-2 can be obtained with composition 9 already.

When melam was used in composition 8 instead of melamine cyanurate (see composition 11), a GWFI of 960° C. was measured. A UL classification of V-0 was realised for compositions 12 and 13. The great advantage in mechanical properties of the compositions based on Amgard P45 is clearly observable here too (compositions 12 and 13).

Also surprising is that the glass fibre reinforcement's adverse effect on the CTI (see composition 2) was entirely counteracted in the composition according to the invention (10 and 12).

The compositions according to the invention also showed substantially better crystallisation behaviour than the compositions according to the state of the art (EP-A-672717). The composition based on melamine cyanurate in particular offers particular advantages in that respect.

When instead of the Amgard P45 the Zn-salt of dimethylphosphonic acid is used in the composition 13 the same flame retardant properties are measured. The mechanical properties are improved significantly. (composition 14)

In Table 2 similar results are shown for polyamides. Especially for the high melting polyamides the advantages of the combination of melamine condensation products and the phosphorus compound with a high phosphorous content are manifest. Actually it is, as far as is known by the inventors, the first time that for the high melting glass fibre reinforced polyamides a non-halogen containing flame retardant composition is obtained fulfilling UL-94, V-O, that also posesses good mechanical and electrical properties.

In the highmelting polyamide the combination of a condensation product of melamine and a metal salt of a phosphinic acid is preferred. If the metal salt alone is been used in the polyamide only for a few metal salts and only in concentrations of at least about 30 wt. % a V-O classification can be obtained for glass fibre reinforced compositions. In the combination with melam etc. with appreciably lower concentrations and for a great number of metals salts a high classification can be realised, thereby giving better mechanical properties.

The compositions of the invention can be moulded into objects that can find wide application. Very advantageous the compositions of the invention are used in the manufacture of electric and electronic parts.

TABLE 2

|  | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| PA-6 | 95 | 45 | 45 |  |  |  |  |  |  |  |  |  |  |  |
| PA-6.6 |  |  |  | 96 | 96 | 60 | 60 | 60 | 45 |  |  |  |  |  |
| PA-4.6 |  |  |  |  |  |  |  |  |  | 90 | 50 | 50 | 45 |  |
| PA 6.6/6.T/6.I |  |  |  |  |  |  |  |  |  |  |  |  |  | 53 |
| Mecy |  | 15 |  | 4 |  | 20 |  |  |  | *) |  |  |  |  |
| Melam | 5 |  | 15 |  | 4 |  | 20 |  | 15 | 10 | 20 | 12 | 15 | 12 |
| Amgard P45 |  | 10 | 10 |  |  |  |  | 20 | 10 |  |  |  | 10 |  |
| [Zn((CH$_2$)$_2$PO$_2$)$_2$]$_k$ |  |  |  |  |  |  |  |  |  |  |  | 8 |  | 8 |
| PPG 3786 |  | 30 | 30 |  |  | 20 | 20 | 20 | 30 |  | 30 | 30 | 30 | 27**) |
| UL-94 1,6 mm 48 h 23° C./50% RH | V-0 | NC | V-2 | V-0 | V-0 | V-2 | V-2 | V-0 | V-0 | V-0 | V-2 | V-0 | V-0 | V-0 |
| GWFI |  | 960 | 850 | 960 | 960 |  | 960 | 960 | 960 |  |  |  |  |  |
| Elongation % |  | 3.2 | 3.0 |  |  |  |  |  |  | 2,6 |  |  |  |  |
| E-modulus [N/mm$^2$].10$^3$ |  | 10 | 10.8 |  |  |  |  |  |  | 11,3 |  |  |  |  |

TABLE 2-continued

|  | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| tensile strength [N/mm$^2$] |  | 152 | 172 |  |  | *) |  |  | 176 |  |  |  |  |  |
| CTI [V] |  | — | — | — | — | — | 500 |  | 600 |  | 450 | 550 |  | 550 |

*) not stable in compounding. T.S. inferior
**) origine glass fibre unknown.

What is claimed is:

1. A halogen free flame-retardant thermoplastic composition comprising:
   a thermoplastic polymer consisting essentially of one or more polyamides, polyesters or mixtures thereof,
   melamine condensation product derived from triazine, and
   a flame-retardant effective amount of an organic phosphorus compound containing at least 14 wt. % phosphorus.

2. The composition of claim 1, wherein, relative to the total weight of the composition, melamine condensation product is present in amount of between 2 and 25 wt. % and the organic phosphorus compound is present in an amount of between 0.5 and 20 wt. %.

3. The composition of claim 1, wherein, relative to the total weight of the composition, the melamine condensation product is present in an amount of between 4 and 16 wt. % and the organic phosphorus compound is present in an amount of between 2 and 10 wt. %.

4. A halogen free flame-retardant thermoplastic composition comprnsing:
   a thermoplastic polymer consisting essentially of one or more polyamides, polyesters or mixtures thereof,
   melam, and
   a flame-retardant effective amount of an organic phosphorus compound containing at least 14 wt. % phosphorus.

5. The composition of claim 4, wherein, relative to the total weight of the composition, melam is present in an amount of between 2 and 25 wt. % and the organic phosphorus compound is present in an amount of between 0.5 and 20 wt. %.

6. The composition of claim 4, wherein, relative to the total weight of the composition, melam is present in an amount of between 4 and 16 wt. % and the organic phosphorus compound is present in an amount of between 2 and 10 wt. %.

7. The composition of claim 1, further comprising glass reinforcing fibers.

8. A molded object which is obtained by molding the composition of claim 1.

9. The composition of claim 1, wherein the melamine condensation product is melam, melem, melon or menthone.

* * * * *